(12) United States Patent
Cavuoti

(10) Patent No.: US 8,607,541 B1
(45) Date of Patent: Dec. 17, 2013

(54) CHAIN AND METHOD OF ASSEMBLY

(71) Applicant: Victor Vito Cavuoti, Toronto (CA)

(72) Inventor: Victor Vito Cavuoti, Toronto (CA)

(*) Notice: Subject to any disclaimer, the term of this patent is extended or adjusted under 35 U.S.C. 154(b) by 0 days.

(21) Appl. No.: 13/864,316

(22) Filed: Apr. 17, 2013

(51) Int. Cl.
*A63H 33/12* (2006.01)
*A63H 33/00* (2006.01)
*F16G 13/16* (2006.01)

(52) U.S. Cl.
USPC .............. 59/2; 59/78; 59/78.1; 59/80; 59/93; 63/39; 446/120; 446/236

(58) Field of Classification Search
USPC ............. 59/78, 78.1, 80, 93; 63/39; 446/120, 446/236
See application file for complete search history.

(56) References Cited

U.S. PATENT DOCUMENTS

| | | | |
|---|---|---|---|
| 566,095 A * | 8/1896 | Reenstierna | 474/203 |
| 1,059,913 A * | 4/1913 | Smith | 59/78 |
| 1,276,117 A * | 8/1918 | Riebe | 464/171 |
| 1,947,113 A * | 2/1934 | Russell | 59/35.1 |
| 2,110,201 A * | 3/1938 | Cornell, Jr. | 59/78 |
| 2,714,269 A * | 8/1955 | Charles | 59/80 |
| 3,192,738 A * | 7/1965 | Charles et al. | 63/39 |
| 3,323,325 A * | 6/1967 | Meyer | 63/4 |
| 4,044,725 A * | 8/1977 | Miller | 119/865 |
| 5,531,625 A * | 7/1996 | Zhong | 446/120 |
| 6,109,999 A * | 8/2000 | Kuo | 446/236 |
| 7,354,330 B2 * | 4/2008 | Bentley, Jr. | 446/102 |
| 8,450,645 B2 * | 5/2013 | Gelmetti | 219/137.51 |

* cited by examiner

*Primary Examiner* — David B Jones

(74) *Attorney, Agent, or Firm* — Ted Masters

(57) ABSTRACT

A chain includes a plurality of links, each link has a first end having a knob and an opposite second end having a cavity, wherein the cavity is shaped and dimensioned to receive the knob of a mating link. The links are joined together knob-to-cavity to form a chain wherein the links can both axially and transversely rotate. In an embodiment, each link has a neck which receives a collar. In another embodiment, a wire is passed through a tunnel in all the links.

15 Claims, 16 Drawing Sheets

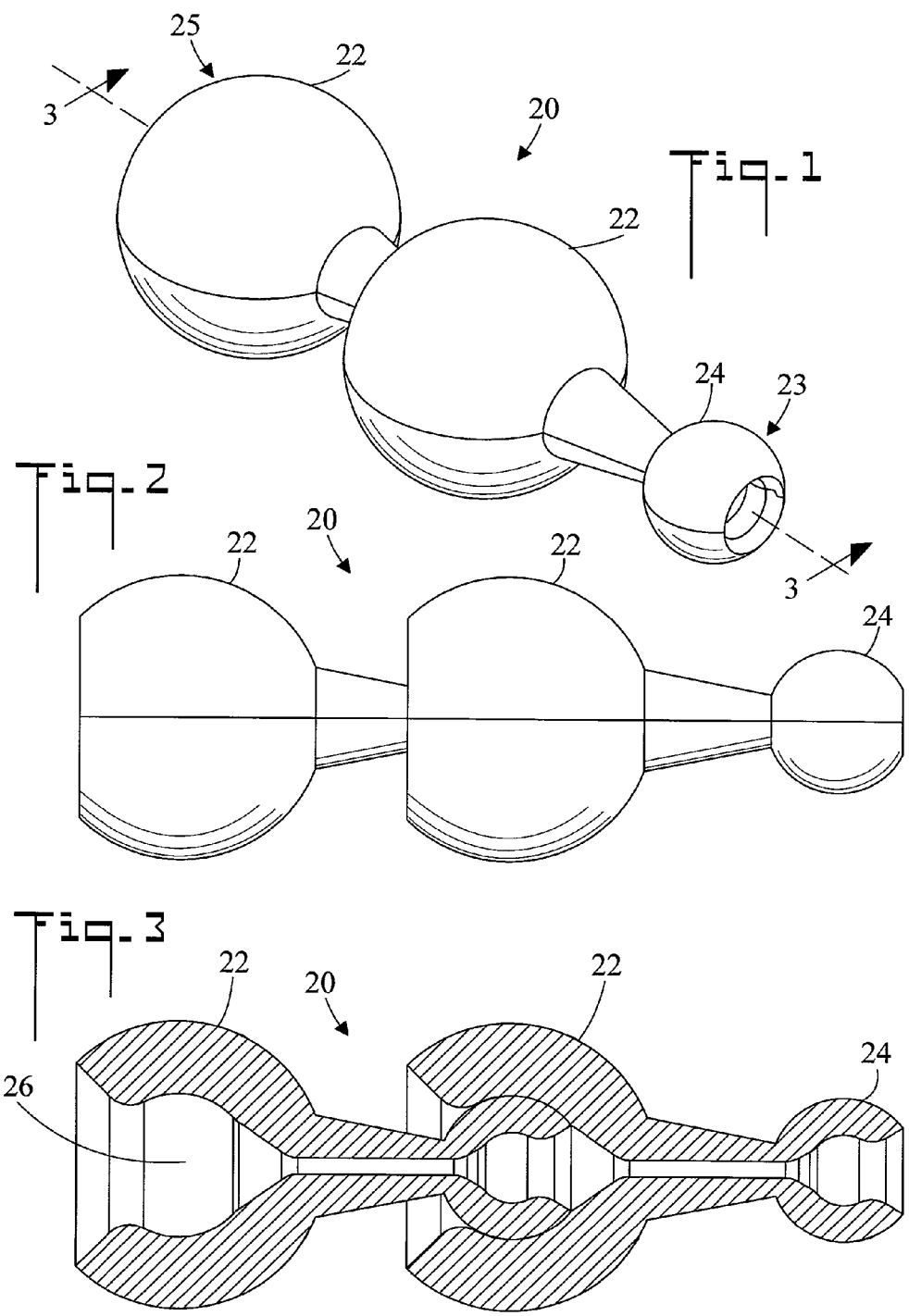

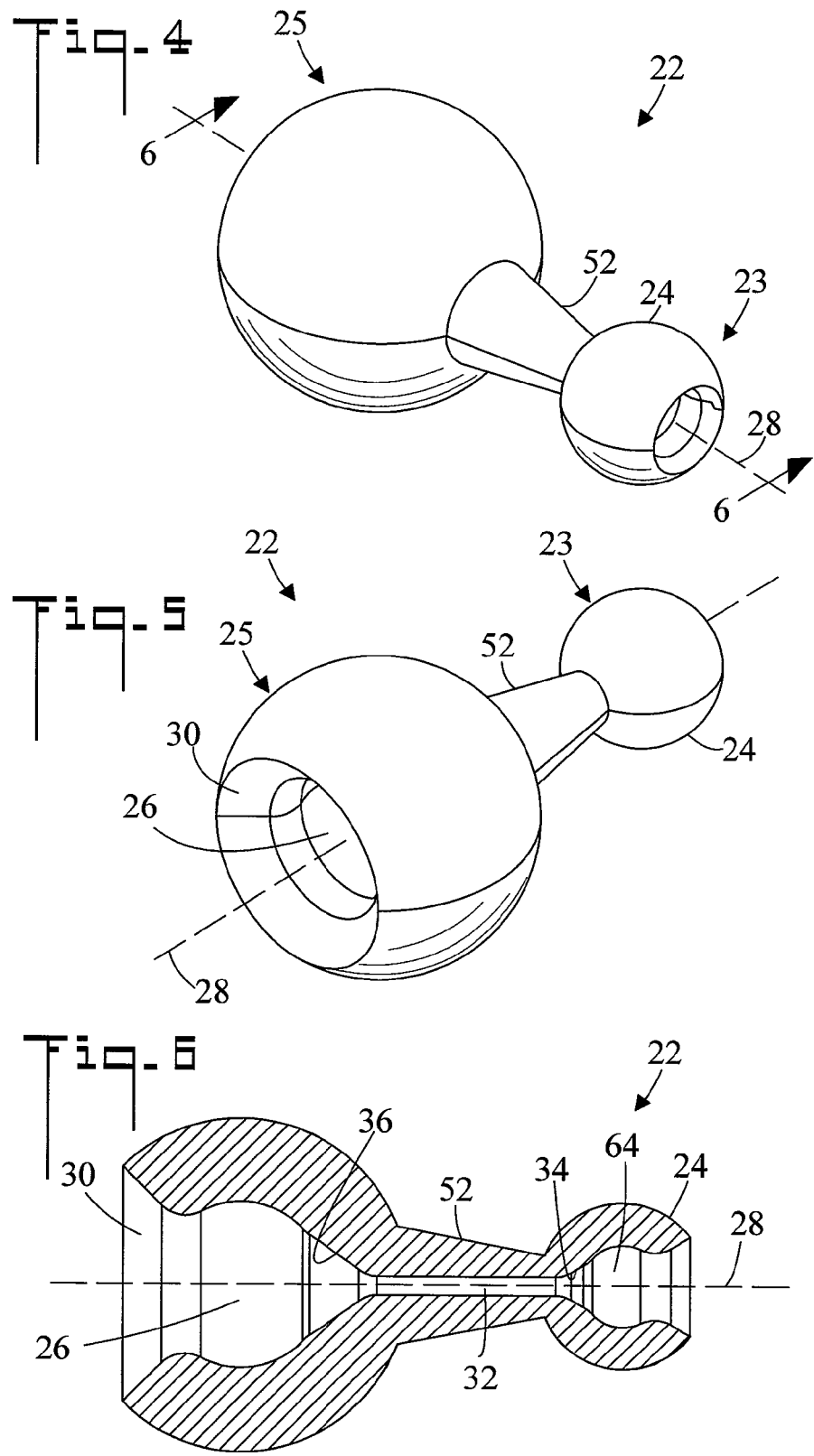

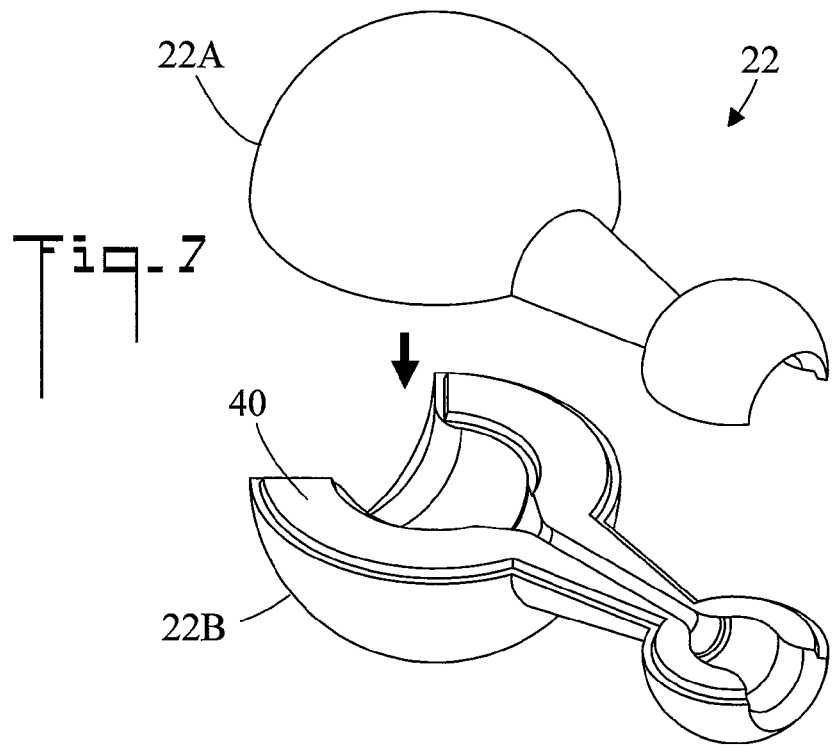
Fig_7
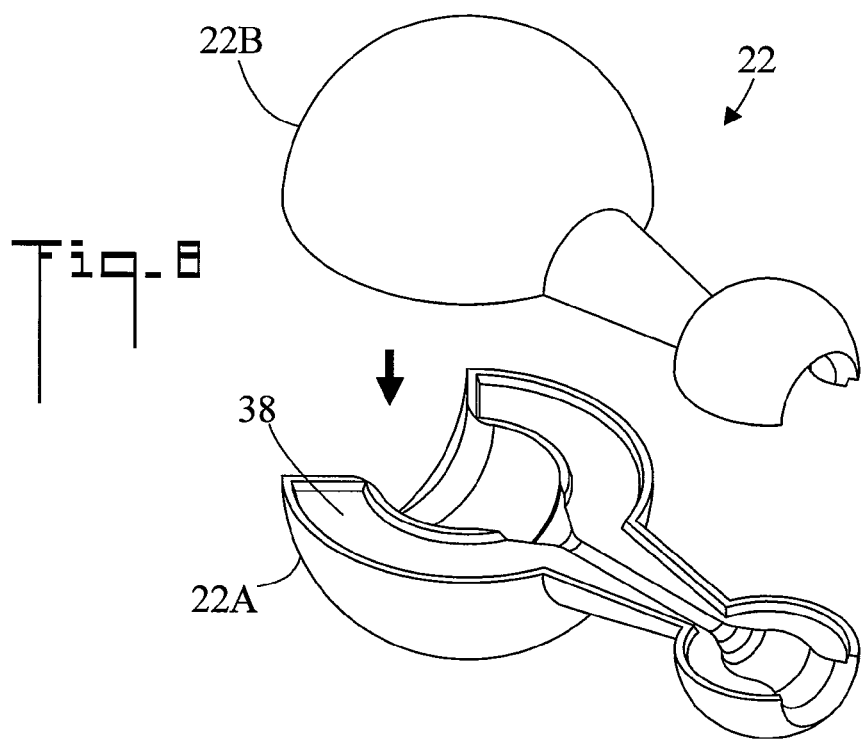
Fig_8

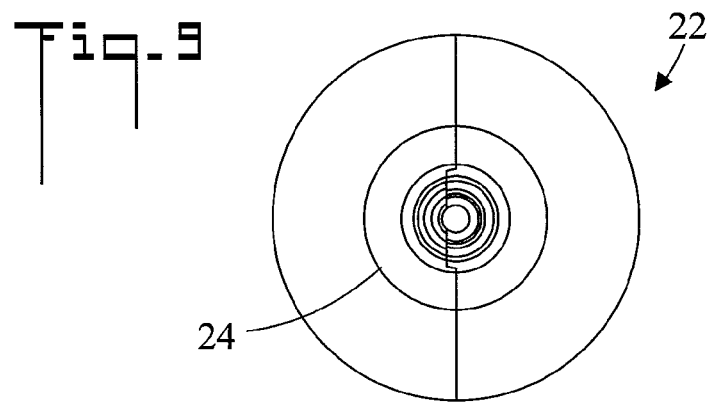
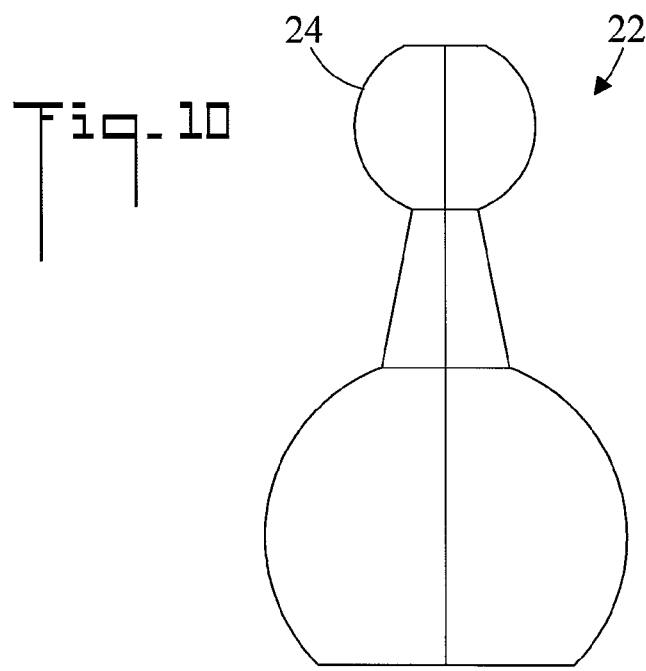
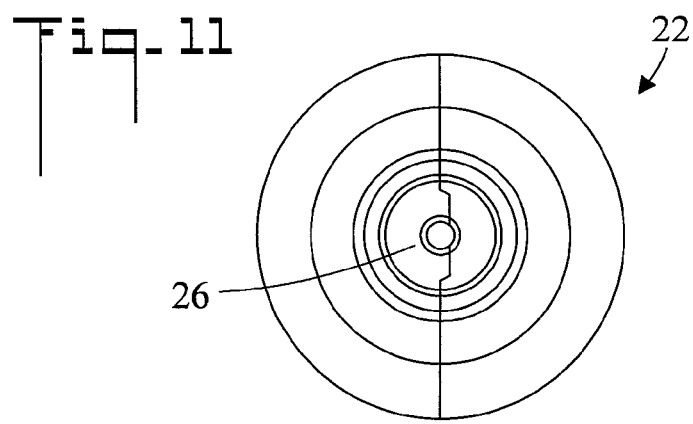

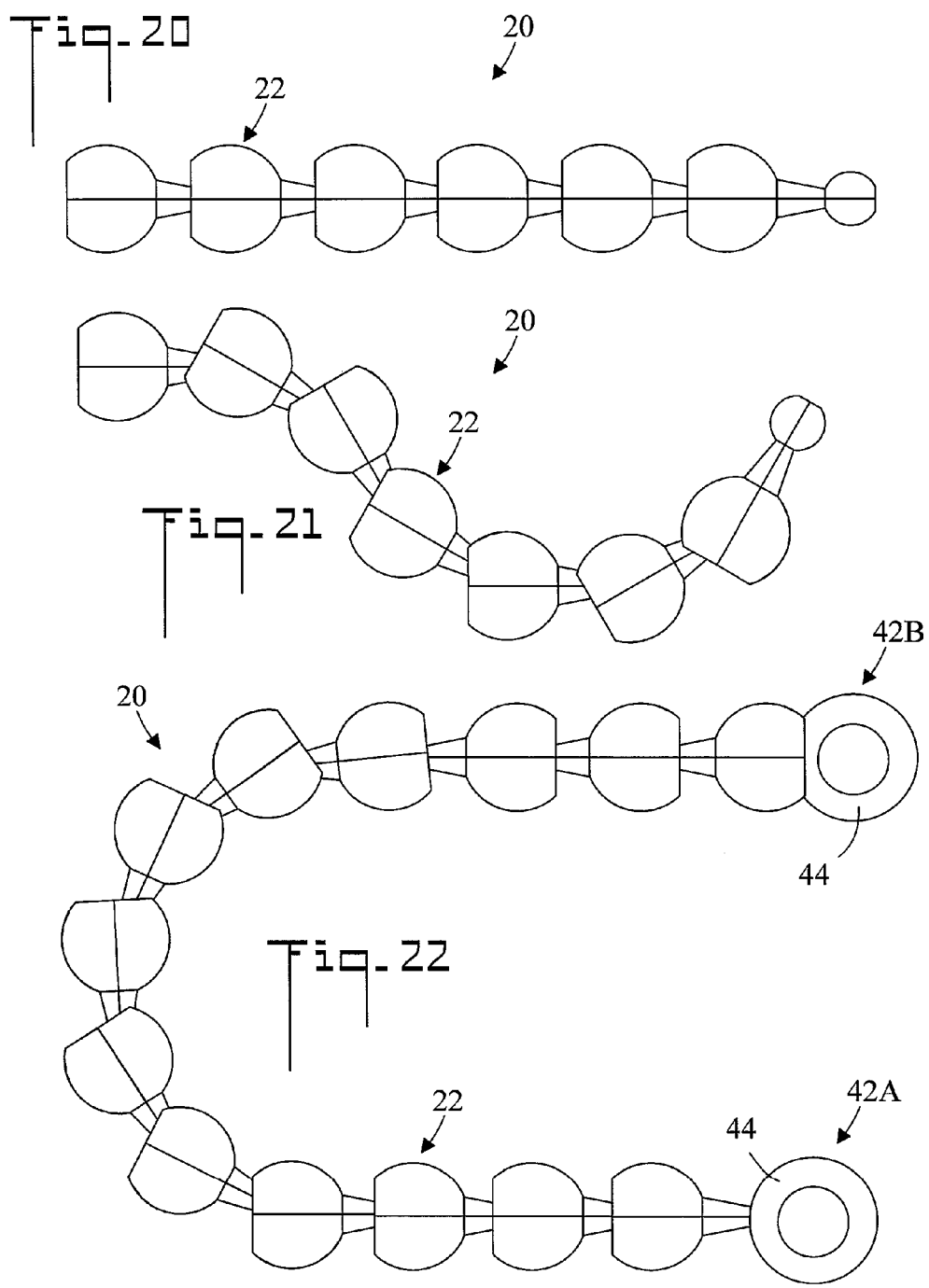

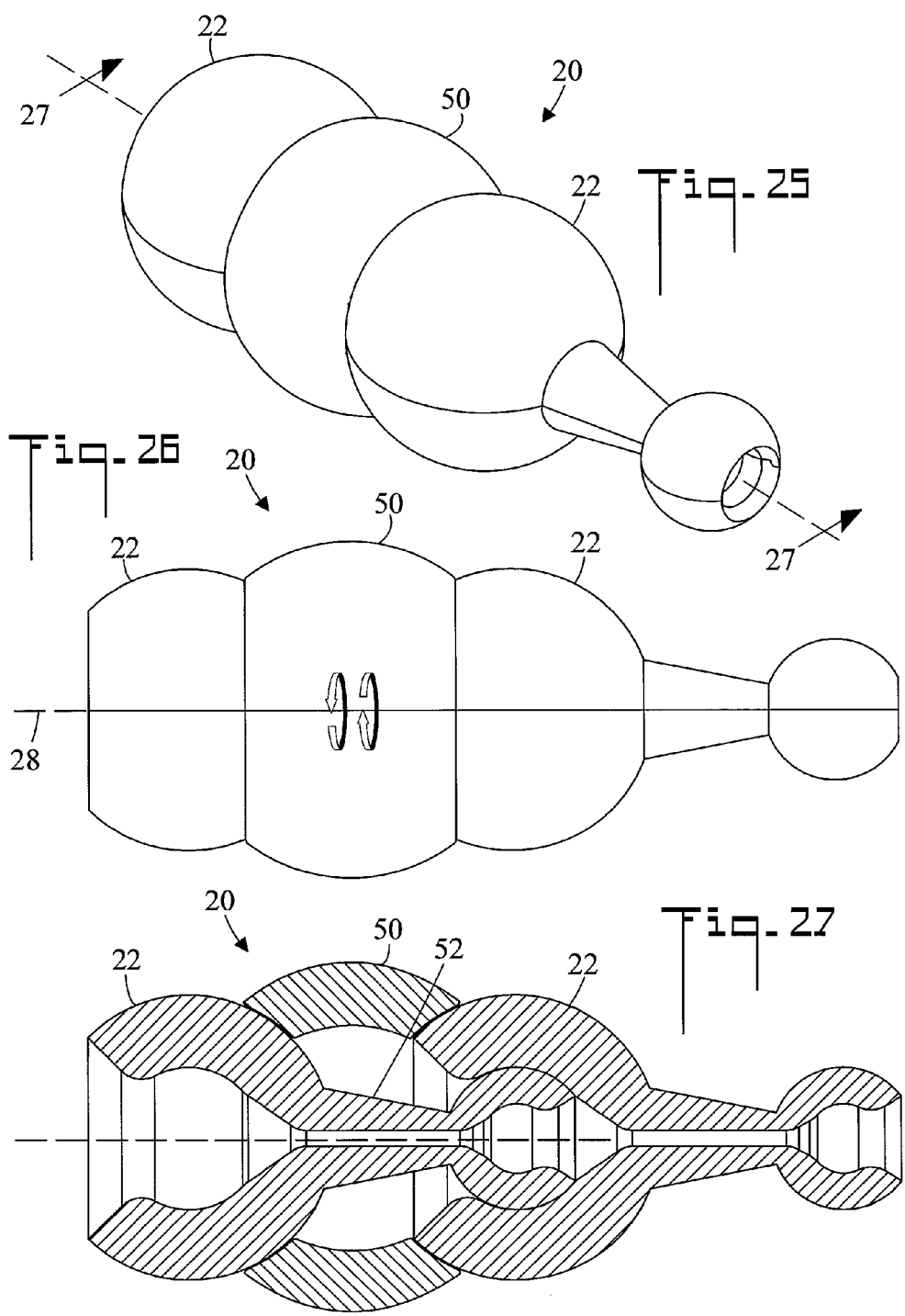

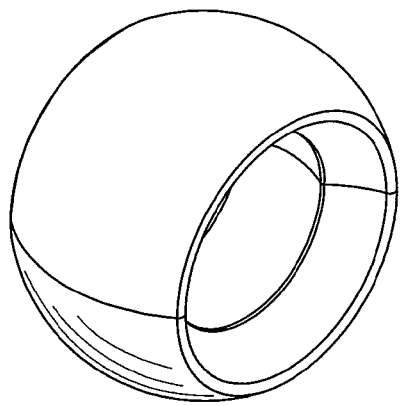
Fig_28
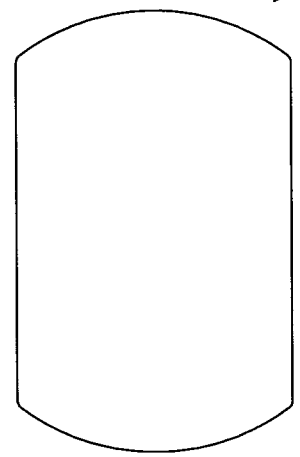
Fig_30
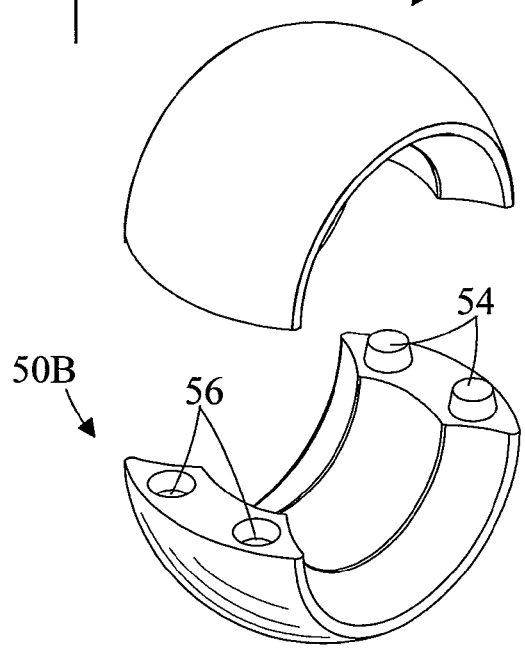
Fig_29
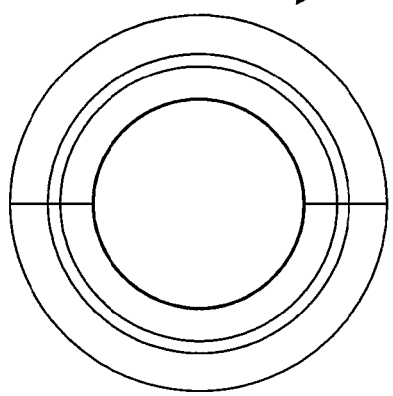
Fig_31

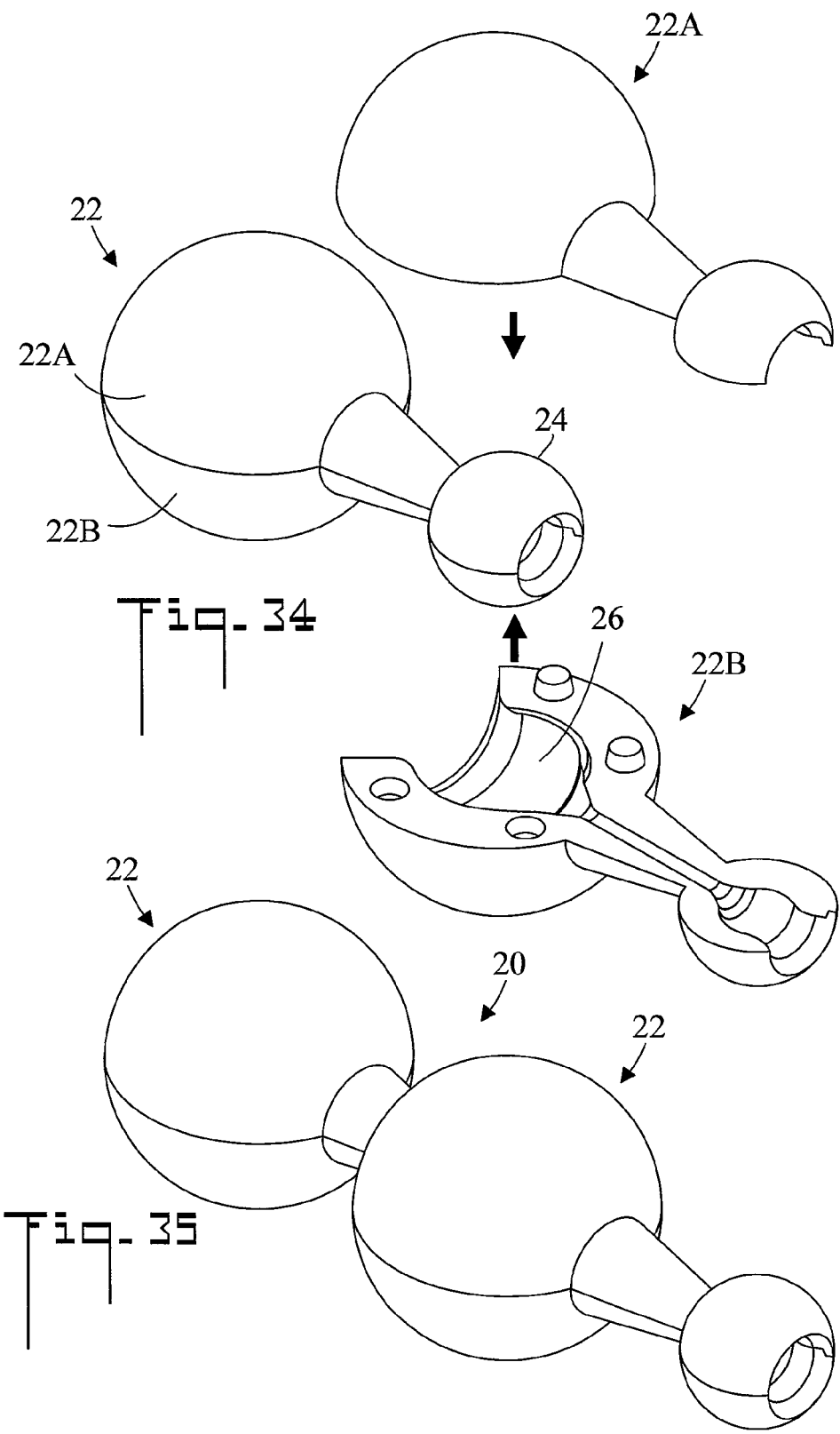

CHAIN AND METHOD OF ASSEMBLY

CROSS REFERENCE TO RELATED APPLICATION

None

TECHNICAL FIELD

The present invention pertains generally to chains, and more particularly to a chain which includes a plurality of interlocking links.

BACKGROUND OF THE INVENTION

Chains are well known in the art. These devices consist of a plurality of looped links, wherein each link interlocks with two mating links. The links can vary in size and shape.

BRIEF SUMMARY OF THE INVENTION

The present invention is directed to a chain which serves the same purpose as a conventional chain. The links of the chain are not loops, but are rather specially shaped pieces in which a knob end is received by a cavity in an adjacent piece. The chain can be utilized for locking one object to another such as a bicycle to a bicycle rack, for connecting a ship anchor, for connecting vehicles, in toys, and the like. The links of the chain are flexible and can mutually bend and rotate. In an embodiment the chain has an inside passage which can receive a linear member, such as for protecting electrical wires and cables, protecting oil pipes, a wire for adding strength to the chain, and the like.

In accordance with an embodiment, a chain includes a plurality of links, each link has (1) a first end having a knob, (2) an opposite second end having a cavity, the cavity shaped and dimensioned to receive the knob of a mating link, and (3) a longitudinal axis. The plurality of links are connectable to form the chain.

In accordance with another embodiment, the knob and the cavity are both semi-spherical in shape.

In accordance with another embodiment, the second end includes a flared opening which communicates with the cavity.

In accordance with another embodiment, when the plurality of links are connected to form a chain, all the links are rotatable about their longitudinal axis.

In accordance with another embodiment, when the plurality of links are connected to form a chain, all links are transversely rotatable with respect to their mating links.

In accordance with another embodiment, each link includes a first half link which is connectable to a second half link.

In accordance with another embodiment, the first half link and the second half link are the same size and shape.

In accordance with another embodiment, each link includes a tunnel disposed along the longitudinal axis, the tunnel extending from the knob to the cavity.

In accordance with another embodiment, the tunnel includes a first flared section at the knob, and a second flared section at the cavity.

In accordance with another embodiment, when the links are connected to form a chain, a wire runs through the tunnels of all the links.

In accordance with another embodiment, the knob includes a light cavity which is shaped and dimensioned to receive a light. The light is electrically connected to the wire.

In accordance with another embodiment, a neck is disposed between the knob and the cavity of each link. A collar is shaped and dimensioned to connect around the neck.

In accordance with another embodiment, the collar is rotatable about the longitudinal axis of the link.

In accordance with another embodiment, the collar includes a first half collar which is connectable to a second half collar.

In accordance with another embodiment, the first half collar and the second half collar are the same size and shape.

In accordance with another embodiment, a female junction includes a plurality of female members, each female member has the opposite second end and a junction end. The junction ends of the plurality of female members are connected together.

In accordance with another embodiment, a male junction includes a plurality of male members, each male member has a first end and a junction end. The junction ends of said plurality of male members are connected together.

Other embodiments, in addition to the embodiments enumerated above, will become apparent from the following detailed description, taken in conjunction with the accompanying drawings, which illustrate, by way of example, the principles of the chain and method of assembly.

BRIEF DESCRIPTION OF THE DRAWINGS

FIG. 1 is a perspective view of a chain;
FIG. 2 is a side elevation view of the chain;
FIG. 3 is a cross sectional view along the line 3-3 of FIG. 1;
FIG. 4 is a front perspective view of a link;
FIG. 5 is a rear perspective view of the link;
FIG. 6 is a cross sectional view along the line 6-6 of FIG. 4;
FIG. 7 is an exploded perspective view of the link;
FIG. 8 is an opposite exploded perspective view of the link;
FIG. 9 is a top plan view of the link;
FIG. 10 is a side elevation view of the link;
FIG. 11 is a bottom plan view of the link:
FIG. 20 is a reduced plan view showing a plurality of links connected to form a chain;
FIG. 21 is a reduced plan view showing the plurality of links transversely rotated to form a sinuous chain;
FIG. 22 is a reduced plan view showing a chain which has end connectors;
FIG. 25 is a perspective view of a collar added to the chain;
FIG. 26 is a side elevation view of the chain with the collar;
FIG. 27 is a cross sectional view along the line 27-27 of FIG. 25;
FIG. 28 is a perspective view of the collar;
FIG. 29 is an exploded perspective view of the collar;
FIG. 30 is a side elevation view of the collar;
FIG. 31 is an end elevation view of the collar.

FIG. 34 is an exploded perspective view showing two links being connected;

FIG. 35 is a perspective view showing the connected links;

DETAILED DESCRIPTION OF THE INVENTION

Figure 12:
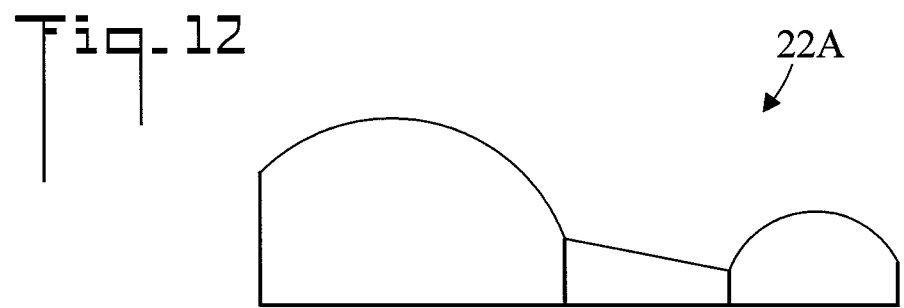
FIG. 12 is a side elevation view of a first half link.

Referring initially to FIGS. 1-3, there are illustrated perspective, side elevation, and cross sectional views respectively of a chain generally designated as 20. FIGS. 4-6 are front perspective, rear perspective, and cross sectional views respectively of a link 22. Chain 20 includes a plurality of links 22, each link 22 has (1) a first end 23 having a knob 24, (2) an opposite second end 25 having a cavity 26 which is shaped and dimensioned to captively receive knob 24 of a mating link 22, and (3) a longitudinal axis 28. A plurality of links 22 are connectable to form chain 20. In FIGS. 1-3 two links 22 are connected, however it may be appreciated that a greater number of links can be connected together as is shown in FIGS. 20-22. In the shown embodiment all links 22 in chain 20 are the same size and shape, however it would also be possible to use links of different sizes and shapes.

Figure 18:
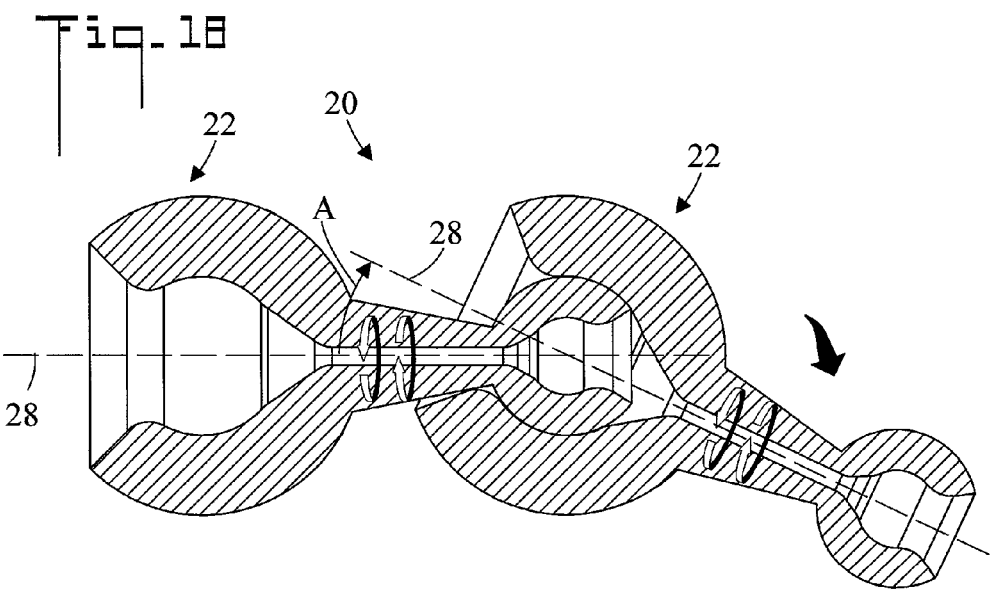
FIG. 18 is a cross sectional view showing link rotation.
Figure 19:
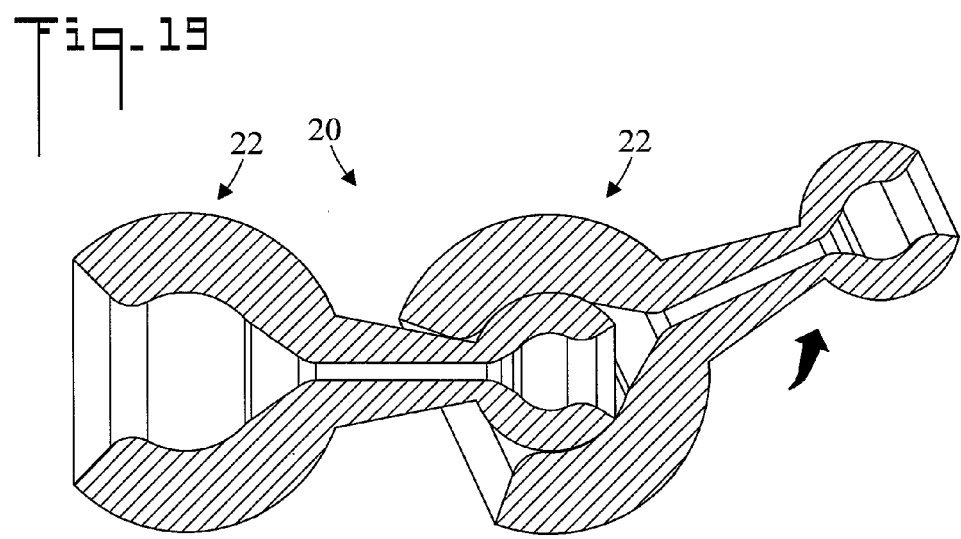
FIG. 19 is another cross sectional view showing link rotation.

Knob 24 is semi-spherical, and cavity 26 is semi-spherical. Semi-spherical means that a part of knob 22 is spherical, and a corresponding part of cavity 26 is spherical. The spherical part of cavity 26 receives the spherical part of knob 24 so that two connected links 22 can rotate with respect to one another. It is noted that second end 25 of link 22 has a flared opening 30 which communicates with cavity 26. This flaring facilitates the transverse rotation of link 22 as is shown in FIGS. 18 and 19.

Referring to FIG. 6, each link 22 includes a tunnel 32 disposed along longitudinal axis 28. Tunnel 32 extends from knob 24 to cavity 26. Tunnel 32 includes a first flared section 34 at knob 22, and a second flared 36 section 36 at cavity 26. In an embodiment, knob 24 includes a light cavity 64 (refer to FIG. 33 and the associated discussion).

Links 22 can be fabricated from various materials depending upon the level of strength required. For a strong chain 20, a metal such as stainless steel or aluminum can be used. In other applications a clear or colored polymer, wood, or even concrete can be used. In a possible embodiment, chain 20 can be made of links 22 which are made from different materials (e.g. one link 22 made from a polymer, another link 22 made from a metal, etc.)

Figure 23:
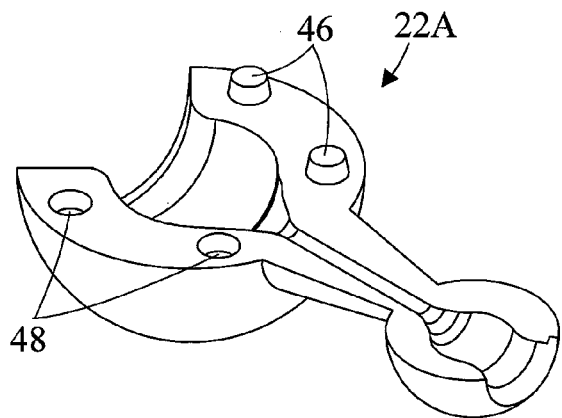
FIG. 23 is a perspective view of a different embodiment half link.
Figure 24:
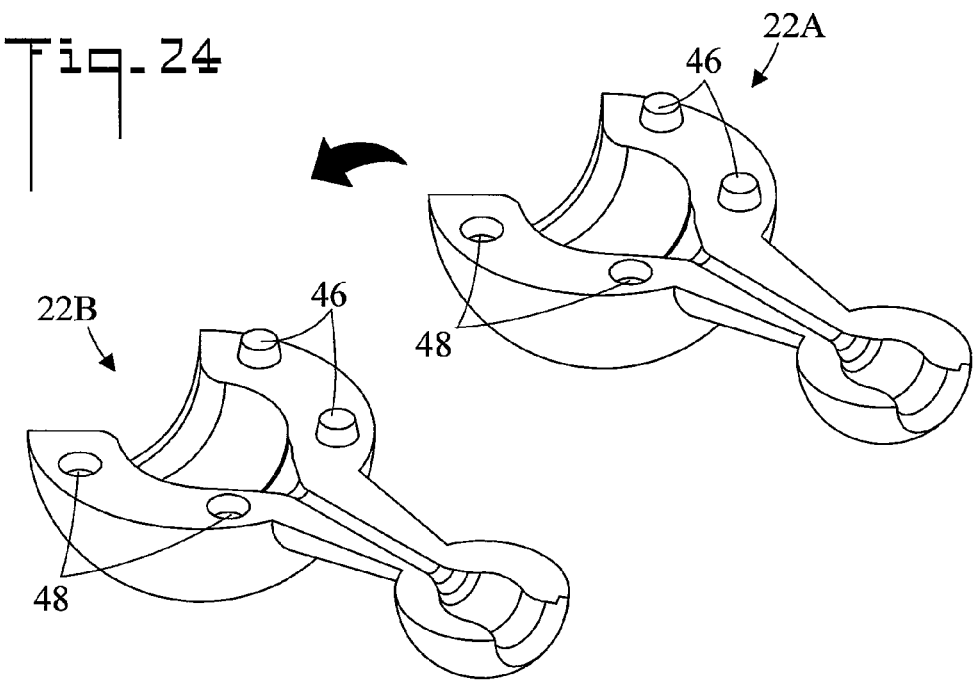
FIG. 24 is a perspective view showing how two half links are connected to form a full link.

FIG. 7 is an exploded perspective view of link 22, and FIG. 8 is an opposite exploded perspective view of link 22. Each link 22 includes a first half link 22A which is connectable to a second half link 22B. In the shown embodiment first half link 22A includes a recess 38 which receives and interlocks with a protrusion 40 disposed on second half link 22B. As such, in the shown embodiment half links 22A and 22B are structurally different. Conversely, FIGS. 23 and 24 show a link 22 in which the two half links are the same size and shape. Halves 22A and 22B can be connected in various ways such as with an adhesive, with a bonding agent, welded, using screws, using pegs, and the like. Further, in one embodiment the connection of the two half links is permanent, and in another embodiment the two half links are removably connected.

Figure 13:
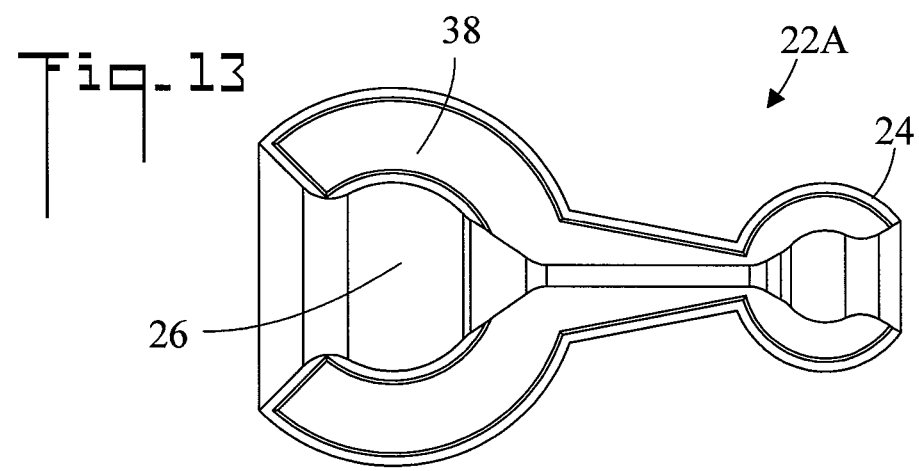
FIG. 13 is a plan view of the first half link.
Figure 14:
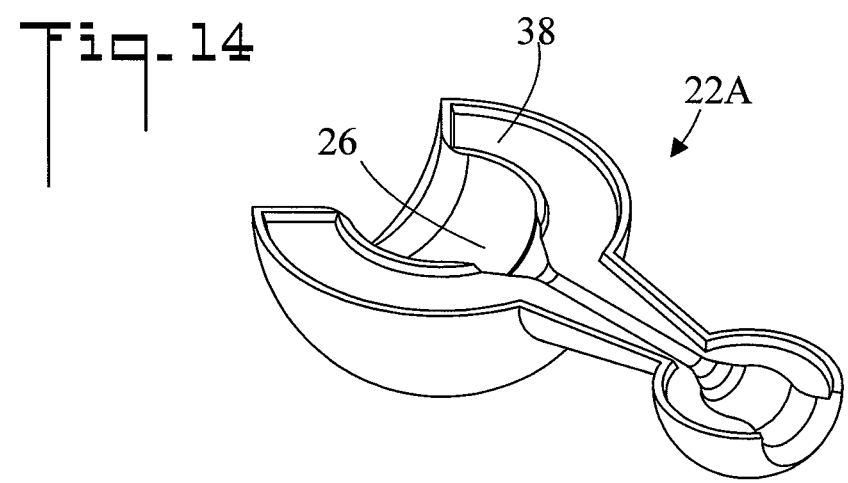
FIG. 14 is a perspective view of the first half link.
Figure 15:
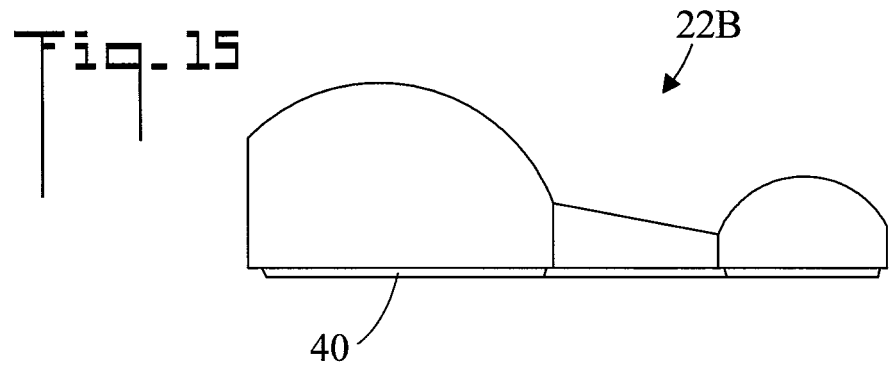
FIG. 15 is a side elevation view of a second half link.
Figure 16:
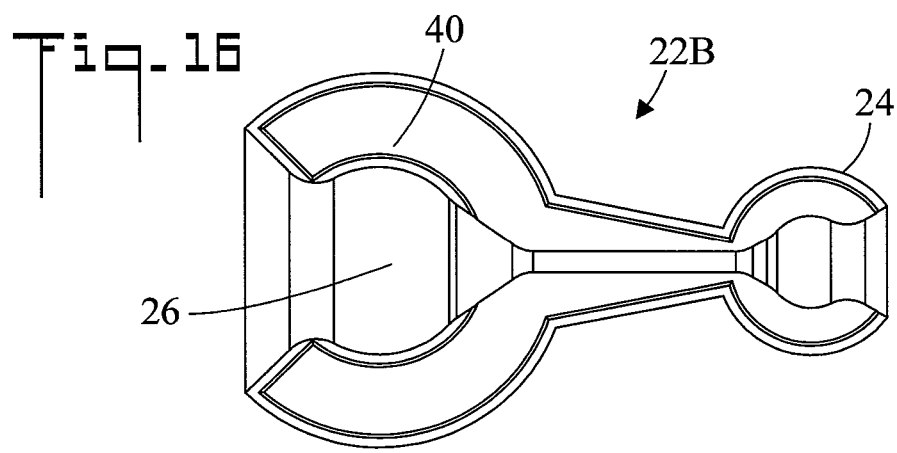
FIG. 16 is a plan view of the second half link.
Figure 17:
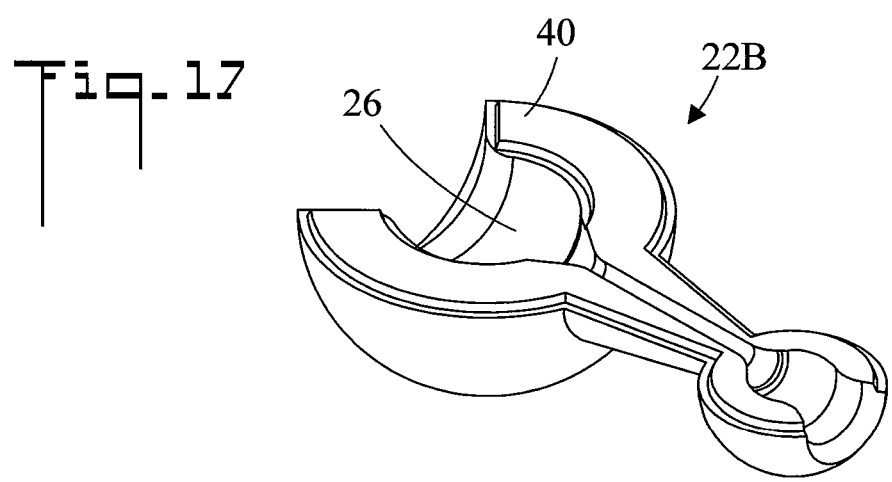
FIG. 17 is a perspective view of the second half link.

FIGS. 9-11 are top plan, side elevation, and bottom plan views respectively of link 22 showing knob 24 and cavity 26. FIGS. 12-14 are side elevation, plan, and perspective view respectively of first half link 22A showing recess 38. FIGS. 15-17 are side elevation, plan and perspective views respectively of second half link 22A showing protrusion 40.

FIGS. 18-19 are cross sectional views showing link 22 rotation. When a plurality of links 22 are connected to form chain 20, all links 22 are individually rotatable 360° about their respective longitudinal axes 28 (as indicated by the circular arrows in FIG. 18). Also, when the plurality of links 22 are connected to form chain 20, all the links 22 are transversely rotatable with respect to their mating links 22 (as indicated by the arrows in FIGS. 18 and 19). Transverse rotation means that the axes 28 of adjoining links form an angle A, rather than being coaxial as in FIGS. 1-3. It is noted that to effect the rotation, cavity 26 is slightly larger than knob 24 so that knob 24 can rotate within cavity 26 (refer to FIG. 4). However, in another possible embodiment links 22 could be fixedly connected together to form a solid non-rotatable structure.

FIG. 20 is a reduced plan view showing a plurality of links 22 connected to form chain 20. FIG. 21 is a reduced plan view showing the plurality of links 22 transversely rotated to form a sinuous chain 20. FIG. 22 is a reduced plan view showing a chain 20 which has end connectors 42A and 42B. End connector 42A includes a loop 44 which is connected to a knob 24 end of link 22, and end connector 42B includes a loop 44 which is connected to a cavity 26 end of link 22. Loops 44 allow the ends of chain 20 to be connected with a locking mechanism such as with a padlock. In another possible embodiment, wheels could be added to link 22 to permit a link 22 or chain 20 to be used as a toy.

FIG. 23 is a perspective view of a different embodiment half link 22A, and FIG. 24 is a perspective view showing how two half links 22A and 22B are connected to form a full link 22. In this embodiment first half link 22A and second half link 22B have the same size and shape. One side of half links 22A and 22B have two posts 46 and the other side have two corresponding holes 48 which are shaped and dimensioned to receive posts 46 of a mating half link. This embodiment differs from that of FIGS. 7 and 8 in which the two half links are structurally different.

FIGS. 25-27 are perspective, side elevation, and cross sectional views respectively of a collar 50 which can be added to chain 20, and FIGS. 28-31 are perspective, exploded perspective, side elevation, and end elevation view respectively of collar 50. Also referring to FIGS. 4-6, a neck 52 is disposed between knob 24 end (first end 23) and cavity 26 end (second end 25) of each link 22. Collar 50 is shaped and dimensioned to connect around neck 52. While as previously shown, chain 20 can be used without collar 50 (i.e. just using links 22), collar 50 adds strength and safety to chain 20 by protecting neck 52. With collar 50 installed, chain 20 is hard to cut (such as with a bolt cutter). This is because the added thickness will not fit in the jaws of the cutter. As shown by the circular arrows in FIG. 26, collar 50 is rotatable about longitudinal axis 28 of link 22, and can rotate independently of link 22. As such, the links 22 and collars 50 tend to axially rotate when cutting is attempted. Referring to FIG. 29, collar 50 includes a first half collar 50A which is connectable to a second half collar 50B. In the shown embodiment, first half collar 50A and second half collar 50B are the same size and shape and include posts 54 and holes 56 (similar to links 22A and 22B of FIGS. 23-24).

Figure 32:
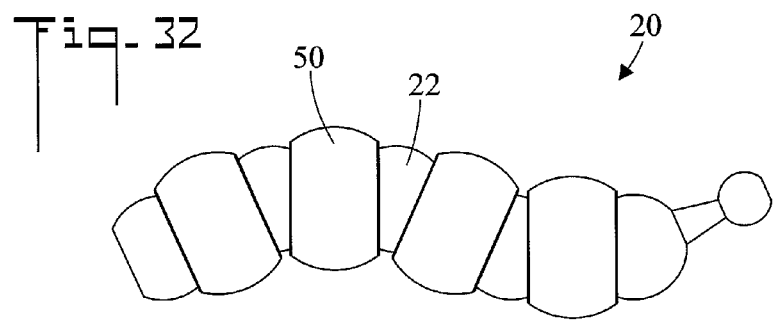
FIG. 32 is a reduced plan view of showings links and collars connected to form a chain.

FIG. 32 is a reduced plan view showings links 22 and collars 50 connected to form a chain 20.

Figure 33:
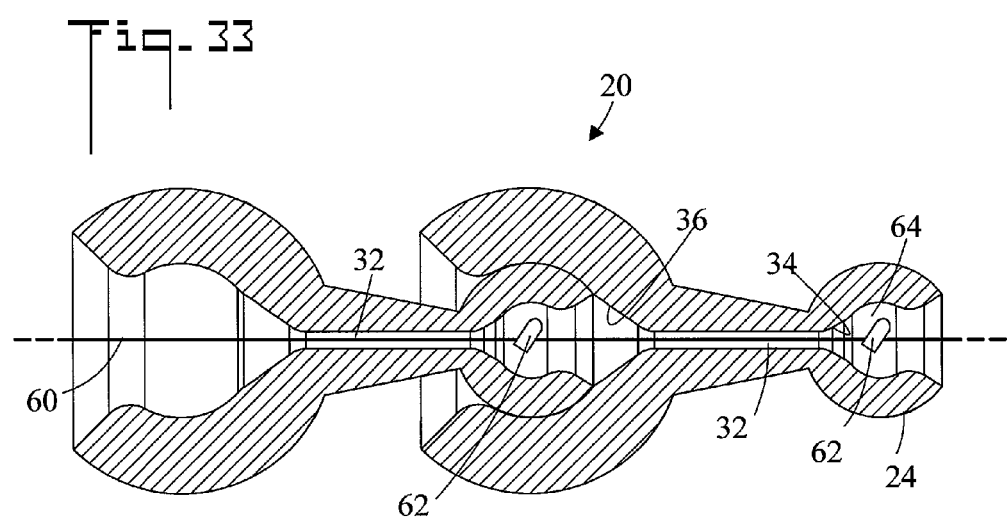
FIG. 33 is a cross sectional view showing two links, a wire, and lights.

FIG. 33 is a cross sectional view showing connected links 22, a wire 60, and lights 62. In this embodiment of chain 20, when links 22 are connected for form chain 20, a wire 60 runs through tunnels 32 of all links 22. Wire 60 add strength to chain 20. In another embodiment, chain 20 includes a light 62 (such as an LED) for each link 22. Knob 24 includes a light cavity 64 which is shaped and dimensioned to receive light 62. Light 62 is electrically connected to, and receives electrical power from wire 60. In this embodiment links 22 can be fabricated from a transparent or translucent material such as a polymer. When lights 62 are illuminated, links 22 will glow. First flared section 34 and second flared section 36 prevent wire 60 from being crimped when links 22 are transversely rotated as in FIGS. 18 and 19.

FIG. 34 is an exploded perspective view showing two links 22 being connected, and FIG. 35 is a perspective view showing the connected links 22. A first link 22 is formed by connecting a first half link 22A to a second half link 22B. Then, another first half link 22A is connected to another second half link 22B, wherein during the connection the knob 24 of the first link 22 is received by the cavity 26 of the second link 22 to form the chain 20 of FIG. 35. This process is repeated to add other links 22 to chain 20.

Figure 36:
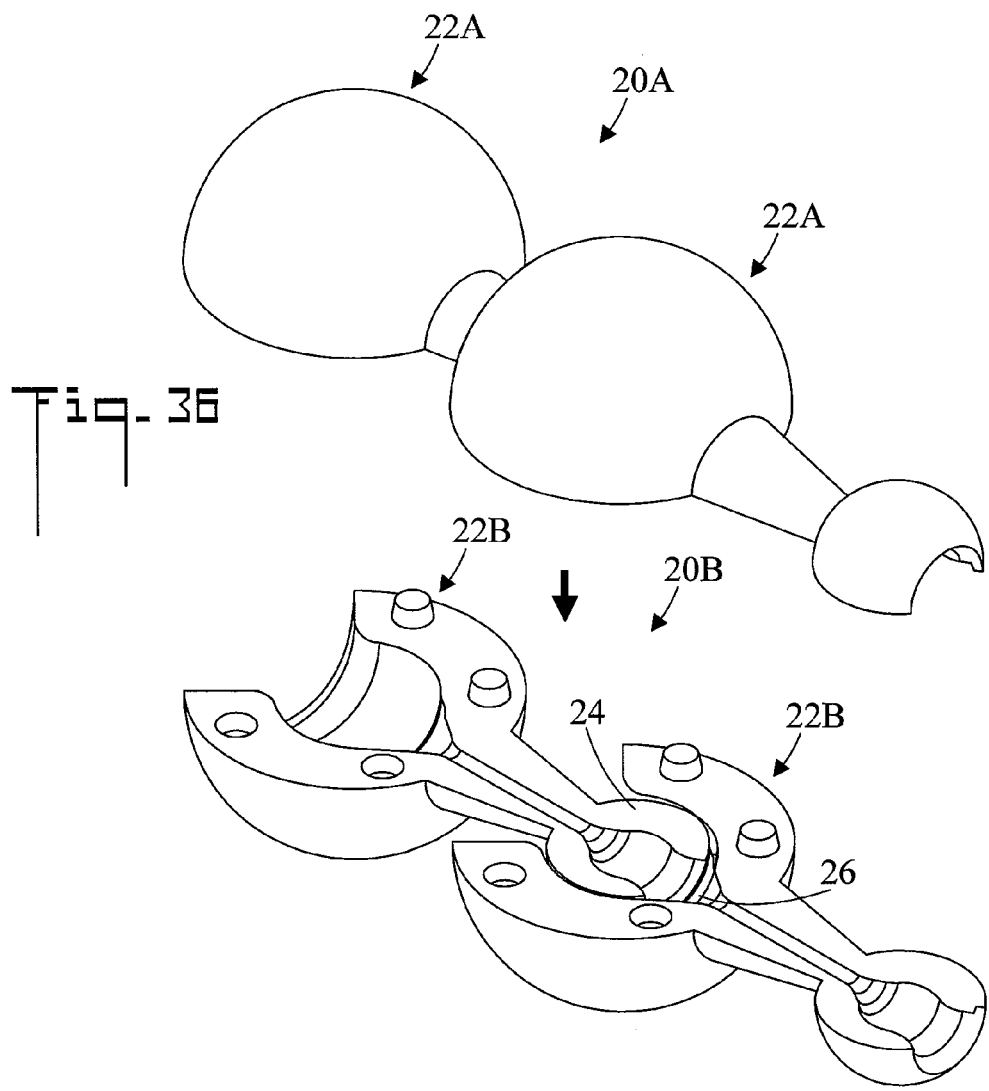
FIG. 36 is an exploded perspective view showing two connected first half links being connected to two connected second half links.

FIG. 36 is an exploded perspective view showing two connected first half links 22A being connected to two connected second half links 22B. In this method of connection, a plurality of half links 22A are first connected to form a first half chain 20A, and a corresponding plurality of second half links 22b are also connected to form a second half chain 20B. Then the two half chains 20A and 20B are connected to form a complete chain 20.

Figure 37:
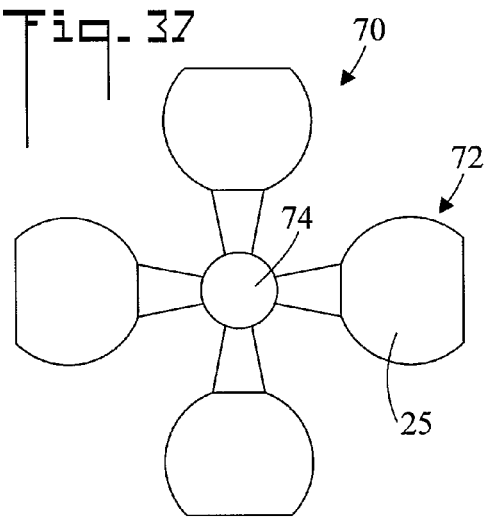
FIG. 37 is plan view of a female junction.
Figure 38:
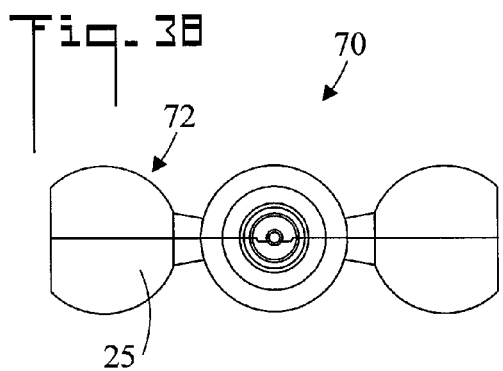
FIG. 38 is a side elevation view of the female junction.

FIGS. 37 and 38 are plan and side elevation views respectively of a female junction 70. Female junction 70 includes a plurality of female members 72, each female member 72 has an opposite second end 25 and a junction end 74. Opposite second end 25 is the same as that shown in FIGS. 1, 4, and 5, and includes a cavity 26 (refer to FIG. 3) which is shaped and dimensioned to receive knob 24. Junction ends 74 of the plurality of female members 72 are connected together. Female junction 70 permits the knob 24 end of a plurality of chains 20 to be connected together.

Figure 39:
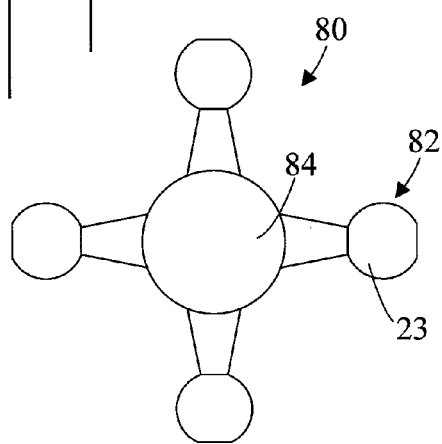
FIG. 39 is a plan view of a male junction.
Figure 40:
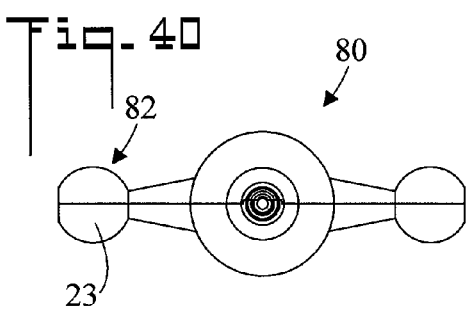
FIG. 40 is a side elevation view of the male junction.

FIGS. 39 and 40 are plan and side elevation views respectively of a male junction 80. Male junction 80 includes a plurality of male members 82, each male member 82 has a first end 23 and a junction end 84. First end 23 is the same as that shown in FIGS. 1, 4, and 5, and includes a knob 24 (refer to FIG. 4) which is shaped and dimensioned to be received by cavity 26. Junction ends 84 of the plurality of male members 82 are connected together. Male junction 80 permits the cavity 26 end of a plurality of chains 20 to be connected together.

Figure 41:
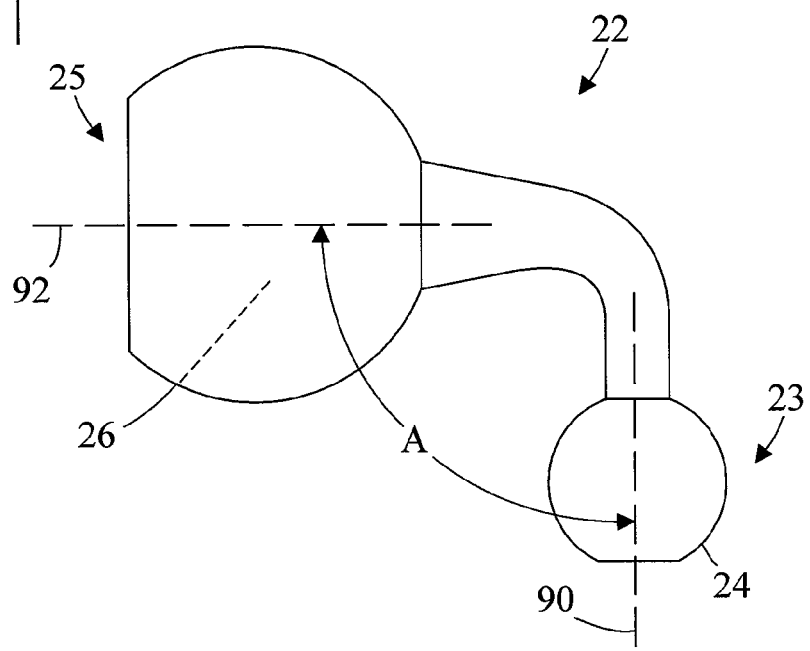
FIG. 41 is a plan view of an angled link.

FIG. 41 is a plan view of an angled link 22. In this embodiment link 22 is not straight as in FIGS. 1-6, but rather first end 23 having knob 24 is angled with respect to second end 25 having cavity 26. First end 23 has a first axis 90 and second end 25 has a second axis 92. Axes 90 and 92 form an angle A which is 90° as shown in FIG. 41. However, it may be appreciated that angle A can be any angle.

Figure 42:
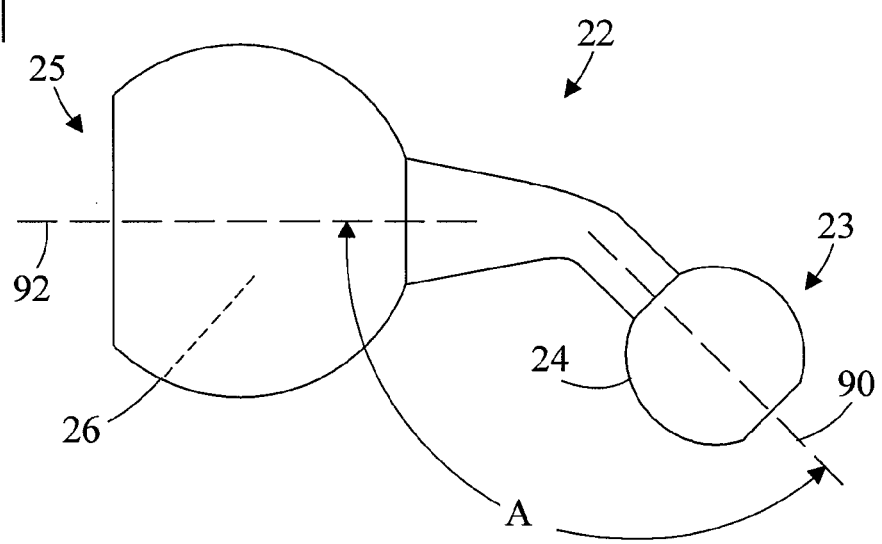
FIG. 42 is a plan view of another angled link.

FIG. 42 is a plan view of another angled link 22. In this embodiment first axis 90 of first end 23 is angled 45° from second axis 92 of second end 25 (i.e. angle A as defined equals) 135°.

In terms of use, a method for assembling a chain includes; (refer to FIGS. 1-42)

(a) providing a chain 20 including;

a plurality of links 22, each link 22 having (1) a first end 23 having a knob 24, (2) an opposite second end 25 having a cavity 26 which is shaped and dimensioned to receive the knob 24 of a mating link 22, and (3) a longitudinal axis 28;

each link 22 including a first half link 22A which is connectable to a second half link 22B;

(b) connecting a first half link 22A to a second half link 22B to form a first link 22; and, (c) connecting another first half link 22A to another second half link 22B to form a second link 22, wherein knob 22 of the first link 22 is received by the cavity 26 of the second link 22.

The method further including:

adding additional links 22 by repeating step (c).

The method further including:

in (a), a neck 52 disposed between knob 24 and cavity 26 of the first link 22;

in (a), providing a collar 50 which is shaped and dimensioned to connect around neck 52; and, after (b), connecting collar 50 around neck 50 of the first link 22.

The method further including:

in (a), collar 50 including a first half collar 50A which is connectable to a second half collar 50B; and, after (b), connecting first half collar 50A to second half collar 50B.

The method further including:

in (a), each link 22 including a tunnel 32 disposed along longitudinal axis 28, tunnel 32 extending from knob 24 to cavity 26;

in (a), providing a wire 60; and, after (c), passing wire 60 through tunnels 32 of the first link 22 and the second link 22.

The method further including;

in (a), providing a light 62 which is electrically connected to wire 60;

in (a), knob 24 including a light cavity 64 which is shaped and dimensioned to receive light 62; and, during (b), placing light 62 in light cavity 64.

The method further including:

after (c), causing first link 22 to transversely rotate with respect to second link 22.

A method for assembling a chain 20, includes (refer to FIGS. 1-42):

(a) providing a chain 20 including;

a plurality of links 22, each link 22 having (1) a first end 23 having a knob 24, (2) an opposite second end 25 having a cavity 26 which is shaped and dimensioned to receive the knob 24 of a mating link 22, and (3) a longitudinal axis 28;

each link 22 including a first half link 22A which is connectable to a second half link 22B;

(b) connecting a first first half link 22A to a second first half link 22A to form a first half chain 20A, wherein the knob 24 of the first first half link 22A is received by the cavity 26 of the second first half link 22A, (c) connecting a first second half link 22B to a second second half link 22B to form a second half chain 20B, wherein knob 24 of the first second half link 22B is received by the cavity 26 of the second second half link; and, (d) connecting the first half chain 20A to the second half chain 20B to form a chain 20.

The embodiments of the chain and method of assembly described herein are exemplary and numerous modifications, combinations, variations, and rearrangements can be readily envisioned to achieve an equivalent result, all of which are intended to be embraced within the scope of the appended claims. Further, nothing in the above-provided discussions of the chain and method should be construed as limiting the invention to a particular embodiment or combination of embodiments. The scope of the invention is defined by the appended claims.

I claim:

1. A chain, comprising:
   a plurality of links, each said link having (1) a first end having a knob, (2) an opposite second end having a cavity, said cavity shaped and dimensioned to receive said knob of a mating said link, and (3) a longitudinal axis;
   said plurality of links being connectable to form said chain;
   each said link including a first half link which is connectable to a second half link; and
   said first half link including a first part of said first end and a first part of said second end, and said second half link including a second part of said first end and a second part of said second end.

2. The chain according to claim 1, further including:
   said first half link and said second half link being the same size and shape.

3. A chain, comprising:
   a plurality of links, each said link having (1) a first end having a knob, (2) an opposite second end having a cavity, said cavity shaped and dimensioned to receive said knob of a mating said link, and (3) a longitudinal axis;
   said plurality of links being connectable to form said chain;
   each said link including a tunnel disposed along said longitudinal axis;
   said tunnel extending from said knob to said cavity; and,
   said tunnel including a first flared section at said knob, and a second flared section at said cavity.

4. A chain, comprising:
   a plurality of links, each said link having (1) a first end having a knob, (2) an opposite second end having a cavity, said cavity shaped and dimensioned to receive said knob of a mating said link, and (3) a longitudinal axis;
   said plurality of links being connectable to form said chain;
   each said link including a tunnel disposed along said longitudinal axis;
   said tunnel extending from said knob to said cavity;
   when said links are connected to form said chain, a wire running through said tunnels of all said links;
   a light;
   said knob including a light cavity which is shaped and dimensioned to receive said light; and,
   said light electrically connected to said wire.

5. A chain, comprising:
   a plurality of links, each said link having (1) a first end having a knob, (2) an opposite second end having a cavity, said cavity shaped and dimensioned to receive said knob of a mating said link, and (3) a longitudinal axis;
   said plurality of links being connectable to form said chain;
   a neck disposed between said knob and said cavity of each said link; and,
   a collar which is shaped and dimensioned to connect around said neck.

6. The chain according to claim 5, further including:
   said collar rotatable about said longitudinal axis of said link.

7. The chain according to claim 5, further including:
   said collar including a first half collar which is connectable to a second half collar.

8. The chain according to claim 7, further including:
   said first half collar and said second half collar being the same size and shape.

9. A chain, comprising:
   a plurality of links, each said link having (1) a first end having a knob, (2) an opposite second end having a cavity, said cavity shaped and dimensioned to receive said knob of a mating said link, and (3) a longitudinal axis;
   said plurality of links being connectable to form said chain;
   a female junction including a plurality of female members, each said female member having said opposite second end and a junction end; and,
   said junction ends of said plurality of female members being connected together.

10. A chain, comprising:
    a plurality of links, each said link having (1) a first end having a knob, (2) an opposite second end having a cavity, said cavity shaped and dimensioned to receive said knob of a mating said link, and (3) a longitudinal axis;
    said plurality of links being connectable to form said chain;
    a male junction including a plurality of male members, each said male member having said first end and a junction end; and,
    said junction ends of said plurality of male members being connected together.

11. A method for assembling a chain, comprising:
    (a) providing a chain including;
        a plurality of links, each said link having (1) a first end having a knob, (2) an opposite second end having a cavity, said cavity shaped and dimensioned to receive said knob of a mating said link, and (3) a longitudinal axis;
        each said link including a first half link which is connectable to a second half link;
    (b) connecting a first half link to a second half link to form a first link;
    (c) connecting another first half link to another second half link to form a second link, wherein said knob of said first link is received by said cavity of said second link;
    in (a), a neck disposed between said knob and said cavity of said first link;
    in (a), providing a collar which is shaped and dimensioned to connect around said neck; and,
    connecting said collar around said neck of said first link.

12. The method of claim 11, further including:
    in (a), said collar including a first half collar which is connectable to a second half collar; and,
    connecting said first half collar to said second half collar.

13. A method for assembling a chain, comprising:
    (a) providing a chain including;
        a plurality of links, each said link having (1) a first end having a knob, (2) an opposite second end having a cavity, said cavity shaped and dimensioned to receive said knob of a mating said link, and (3) a longitudinal axis;
        each said link including a first half link which is connectable to a second half link;

(b) connecting a first half link to a second half link to form a first link;

(c) connecting another first half link to another second half link to form a second link, wherein said knob of said first link is received by said cavity of said second link;

in (a), each said link including a tunnel disposed along said longitudinal axis, said tunnel extending from said knob to said cavity;

in (a), providing a wire; and, after (c), passing said wire through said tunnels of said first link and said second link.

14. The method of claim 13, further including;

in (a), providing a light which is electrically connected to said wire;

in (a), said knob including a light cavity which is shaped and dimensioned to receive said light; and, during (b), placing said light in said light cavity.

15. A method for assembling a chain, comprising:

(a) providing a chain including;

a plurality of links, each said link having (1) a first end having a knob, (2) an opposite second end having a cavity, said cavity shaped and dimensioned to receive said knob of a mating said link, and (3) a longitudinal axis;

each said link including a first half link which is connectable to a second half link;

(b) connecting a first first half link to a second first half link to form a first half chain, wherein said knob of said first first half link is received by said cavity of said second first half link, (c) connecting a first second half link to a second second half link to form a second half chain, wherein said knob of said first second half link is received by said cavity of said second second half link; and, (d) connecting said first half chain to said second half chain to form a chain.

* * * * *